Dec. 23, 1941.     T. A. BOWERS     2,267,368
PISTON RING
Filed Aug. 4, 1939
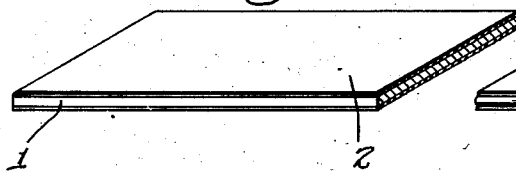
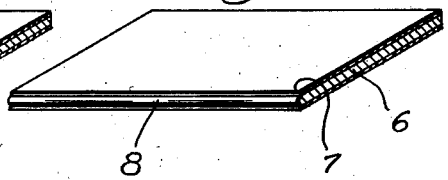
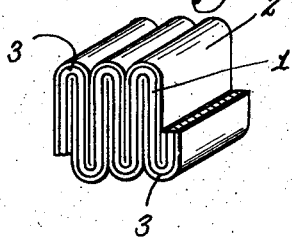
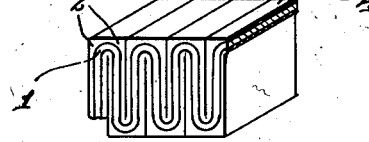
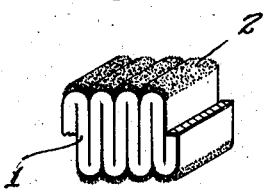
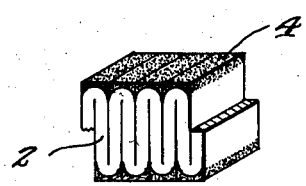
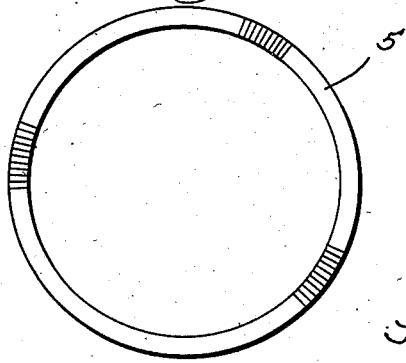
Inventor
Thomas A. Bowers
by Monroe H. Hamilton
Attorney Patented Dec. 23, 1941

2,267,368

UNITED STATES PATENT OFFICE 2,267,368

PISTON RING

Thomas A. Bowers, Boston, Mass., assignor to Power Research Corporation, Boston, Mass., a corporation of Massachusetts Application August 4, 1939, Serial No. 288,384

3 Claims. (Cl. 309—44)

This invention relates to packing and more especially to flexible piston rings of the type fabricated from ribbon material for use with pistons and the like.

In forming packing or piston rings from a strip of material, as for instance metal ribbon, difficulty may arise due to thinning of those portions of the ribbon which are required to be bent, and then flattened to provide substantially flat surfaces. In some instances, it is desirable to make use of very thin gage ribbon which is more susceptible to the development of weakness from bending or forming. In addition, the material composing the metal ribbon may be of an exceedingly tough nature, as for instance steel, which does not readily adapt itself to being formed or flattened out into the flat surfaces referred to, necessitating the use of expensive equipment and considerable pressure. Also, while a durable ribbon material such as steel furnishes adequate strength characteristics, it may be unsatisfactory due to its wearing surfaces being undesirably harder than those surfaces upon which the steel may wear.

It is a chief object of this invention to deal with the difficulties noted and provide a reversely folded ring structure having folded portions which have been reinforced and strengthened, the ring structure being adapted to becoming more easily formed or flattened out with consequent reduction of pressure required and simplification of equipment employed in the forming.

It is a further object of the invention to provide improved methods of forming fabricated piston ring material resulting in a structure which comprises durability with relatively soft wearing surfaces.

These and other objects of the invention will appear in the following description when read in connection with the accompanying drawing, and the novel features will be particularly pointed out in the appended claims.

In the drawing:

Figure 1 is a perspective view showing a length of piston ring material of the invention.

Fig. 2 is a perspective view illustrating a modification of piston ring material.

Fig. 3 is another fragmentary perspective view illustrating a step in the formation of a ring from the material shown in Fig. 1.

Fig. 4 is still another fragmentary perspective view illustrating a final step of flattening reversely folded material to provide a finished packing.

Fig. 5 is a fragmentary perspective view of a modified piston ring material.

Fig. 6 is a perspective view illustrating a step of flattening a material such as that illustrated in Fig. 5; and Fig. 7 is a plan view illustrating a finished packing ring.

In accordance with my invention, I provide a packing material 1 which may comprise a substance such as steel or alloy or other suitable material. In the preparation of a packing such as a piston ring from such material, it is customary to reversely fold a ribbon of material upon itself and compact it into a ring-shaped body. Thereafter the ring is further compacted and the folded tops and bottoms are formed under pressure to provide flat surfaces. This is usually effected by passing the ring body under pressure through a tapered die while the ring is supported at its top and bottom sides. To obviate the use of high pressure in this operation and to reduce the possibility of the material 1 becoming weakened by thinning at the points of bending and flattening, this invention provides for associating additional reinforcing material 2 with the material 1, and it is intended that this association may be effected in several ways and the material 2 may be comprised by various substances as metals, alloys, and other suitable materials.

One method of applying the reinforcing material 2 consists in electroplating with a metal such as copper or nickel. Other methods of coating may be desired to be employed, as for example spraying of liquid materials. Also I may choose to dispose sheets of metal foil at one or the other or both sides of the material 1.

Fig. 3 illustrates a succeeding step of reversely folding this coated strip upon itself and compacting it into an annular body having rounded tops and bottoms 3. These rounded portions are then formed and flattened in such a manner as to provide flat surfaces as illustrated in Fig. 4.

It will be observed that the material 2 at the outside of the tops and bottoms 3 has become flowed and formed to comprise crown forming portions 4 for the ring, while the material 1 has been preserved in a substantially unchanged and unthinned condition even at the points of bending. By employing for the material 2 a substance substantially softer than that comprising the material 1, as for example copper, it will be readily seen that less pressure will be required to form the crown portions 4. This makes possible the use of simpler forming equipment.

More important, however, is the fact that by allowing the material 2 to be subjected to the forming which is required, folded portions of the material 1 are preserved with their original thickness and substantially no thinning of the folded portions relative to other portions of the material 1 occurs.

A further advantage resulting from employing a second material softer than the original material consists in the fact that two of the surfaces of the ring body and portions of the remaining two surfaces adapt themselves to "wearing in" on the cylinder surface much quicker than would be the case were the ring entirely composed of a hard material such as steel.

Another procedure of my invention for arranging the material 2 to comprise crown forming portions of a ring body consists in reversely folding a strip of uncoated material into an annular body. The material 2 is then applied at the tops and bottoms of the ring body, as has been illustrated in Fig. 5. Thereafter this body is treated in a die and flattened, as above described, to furnish the crown forming portions 4 having scalloped under sides which overlie the connecting portions of the reversely bent strip in a ring 5.

Another modification of my invention consists in providing a strip of packing material 6, one edge of which is rounded as indicated by numeral 8. The material 6 may or may not carry a coating 7 as desired. It is pointed out that this rounded edge may be useful to further facilitate quick "wearing in" of a piston ring.

It will be observed that the use of reinforcing material 2 provides a reversely folded strip ring having relatively thin webs or legs and relatively thick crowns, which both improve operation of the ring and cheapen its cost.

I may also desire to employ a length of this material in other types of packing, as for example in forming an oil ring in which case the compacted strip of piston ring material may be stretched or opened to provide oil passageways.

It is pointed out that the invention introduces a novel method of making fabricated packing material from ribbon material. There is effected increased crown strength in a fabricated ring, and improved "wearing in" character of the ring generally. A novel method is presented by which simplified forming of crown portions in a fabricated ring structure is carried out and a simple, cheap and efficient packing is provided.

It is intended that various modifications in types of materials as well as methods of forming and association of the materials may be resorted to, while continuing to adhere to the spirit of the invention.

I claim:

1. A piston ring comprising a plurality of layers of sheet metal, bends of the sheet metal connecting the layers together, separately attached crown-forming segments of piston ring material secured to the bends, said crown-forming segments having scalloped under sides which extend radially between the inner and outer peripheries of the ring, edges of the scalloped under sides terminating adjacent points of meeting of the layers and said crown-forming segments being formed with flattened outer sides adapted to provide land surfaces for the ring.

2. A piston ring construction comprising a ring body made up of a plurality of layers of resilient sheet metal having interstices therebetween, connecting portions for the said layers consisting of bends of the sheet metal, said connecting portions having separately attached crown-forming segments of piston ring material secured thereto, the crown-forming portions having scalloped under sides which overlie the connecting portions and extend radially of the ring, said scalloped sides terminating adjacent points of meeting of the layers, and said crown-forming segments further formed with flat upper sides adapted to provide reinforced land surfaces for the ring.

3. A piston ring construction comprising a ring body made up of a plurality of layers of resilient sheet metal having interstices therebetween, said layers being adapted to be compacted upon one another and close the interstices throughout a portion of the axial length of the layers, connecting portions for the said layers separately attached, crown-forming segments of piston ring material secured to the connecting portions, said crown-forming segments being spaced apart by interstices which are a continuation of the said interstices between the layers of sheet metal, the crown-forming segments having scalloped under sides which extend radially of the ring and terminate at points of meeting of the layers of resilient sheet metal, and said crown-forming segments further formed with flat upper sides adapted to provide reinforced land surfaces for the ring.

THOMAS A. BOWERS.